United States Patent
Meng et al.

(10) Patent No.: US 11,532,127 B2
(45) Date of Patent: Dec. 20, 2022

(54) VIRTUAL OBJECT DRIVING METHOD, APPARATUS, ELECTRONIC DEVICE, AND READABLE STORAGE MEDIUM

(71) Applicant: BEIJING BAIDU NETCOM SCIENCE TECHNOLOGY CO., LTD., Beijing (CN)

(72) Inventors: Qingyue Meng, Beijing (CN); Chen Zhao, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/196,664

(22) Filed: Mar. 9, 2021

(65) Prior Publication Data
US 2021/0383607 A1     Dec. 9, 2021

(30) Foreign Application Priority Data
Jun. 8, 2020  (CN) .......................... 202010513294.3

(51) Int. Cl.
*G06T 19/00*      (2011.01)
*G06T 7/246*      (2017.01)
(Continued)

(52) U.S. Cl.
CPC ............ *G06T 19/00* (2013.01); *G06K 9/6256* (2013.01); *G06T 7/251* (2017.01); *G06V 40/28* (2022.01);
(Continued)

(58) Field of Classification Search
None
See application file for complete search history.

(56) References Cited

U.S. PATENT DOCUMENTS

2010/0306701 A1*  12/2010  Glen .................... G11B 27/105
                                                     715/810
2017/0177087 A1*  6/2017  Lerner .................. G06F 3/0304
(Continued)

FOREIGN PATENT DOCUMENTS

CN       109191548 A    1/2019
JP       H11259660 A    9/1999
(Continued)

OTHER PUBLICATIONS

The EESR of the parallel EP application No. 21162229.5.
(Continued)

*Primary Examiner* — Tapas Mazumder
(74) *Attorney, Agent, or Firm* — J.C. Patents (57) ABSTRACT

The present application discloses a virtual object driving method, an apparatus, an electronic device and a readable storage medium, which relate to technical fields of artificial intelligence and deep learning. A specific implementing solution is as follows: obtaining a target image of a real object acquired by a camera when the real object makes a limb movement; inputting the target image into a coordinate acquisition model to obtain coordinates of a plurality of key points on a limb of the real object; determining a posture of the limb of the real object according to coordinates of each key point; driving, according to the posture of the real object, a virtual object displayed on a screen to present the limb movement of the real object. The method greatly reduces operation complexity and cost consumption when driving a virtual image.

12 Claims, 5 Drawing Sheets

(51) Int. Cl.
*G06K 9/62* (2022.01)
*G06V 40/20* (2022.01)

(52) U.S. Cl.
CPC ............... *G06T 2207/20081* (2013.01); *G06T 2219/004* (2013.01)

(56) References Cited

U.S. PATENT DOCUMENTS

| | | | |
|---|---|---|---|
| 2018/0225858 A1* | 8/2018 | Ni | G06T 13/40 |
| 2020/0046322 A1* | 2/2020 | Silberman | A61B 8/54 |
| 2021/0133985 A1* | 5/2021 | Huang | G06T 7/248 |

FOREIGN PATENT DOCUMENTS

| | | | |
|---|---|---|---|
| JP | 2007066094 A | 3/2007 | |
| JP | 2015116308 A | 6/2015 | |
| JP | 6585866 B1 | 10/2019 | |
| WO | WO2016132371 A1 | 8/2016 | |
| WO | WO 2020 000096 A1 | 1/2020 | |
| WO | WO2020000096 A1 | 1/2020 | |
| WO | WO2020105871 A1 | 5/2020 | |

OTHER PUBLICATIONS

First Office Action of the parallel application KR10-2021-0034282.
First Office Action of the parallel application JP2021-050134.
Second Office Action of the parallel application JP2021-050134.

\* cited by examiner

User    Terminal device

FIG. 4

Determining angle information between a first part and a second part according to coordinates of a first key point, coordinates of a second key point, and coordinates of a third key point — S501

Determining, according to the angle information, a posture of a limb represented by the first part and the second part — S502

VIRTUAL OBJECT DRIVING METHOD, APPARATUS, ELECTRONIC DEVICE, AND READABLE STORAGE MEDIUM

CROSS-REFERENCE TO RELATED APPLICATION

This application claims priority to Chinese Patent Application No. 202010513294.3, filed on Jun. 8, 2020, which is hereby incorporated by reference in its entirety.

TECHNICAL FIELD

Embodiments of the present application relate to technical fields of artificial intelligence and deep learning in the computer field, in particular to a virtual object driving method, an apparatus, an electronic device and a readable storage medium.

BACKGROUND

A virtual character may refer to a virtual character image created using Computer Graphics (CG) and other technologies, for example, the virtual character may include a virtual character in a 3D animated film, a virtual character in a live streaming platform, etc. By taking the live streaming platform as an example, according to a movement of a real person who is on live, a virtual character is driven to present a same movement as the real person, so as to meet actual needs in specific scenarios. In these scenarios, how to drive the virtual character to present the same movement as the real person based on the real person's movement is a problem that needs to be solved.

In the prior art, a key point movement of a real person may be captured by a special movement capture equipment, and then a virtual character is driven to present a same movement according to the movement of the real person.

However, using the method of the prior art may lead to complicated operations and high cost.

SUMMARY

The present application provides a virtual object driving method, an apparatus, an electronic device and a readable storage medium.

According to an aspect of the present application, a virtual object driving method is provided, including:

obtaining a target image of a real object acquired by a camera when the real object makes a limb movement; inputting the target image into a coordinate acquisition model to obtain coordinates of a plurality of key points on a limb of the real object in the target image; determining a posture of the limb of the real object according to coordinates of each key point; driving, according to the posture of the real object, a virtual object displayed on a screen to present the limb movement of the real object.

According to another aspect of the present application, a virtual object driving apparatus is provided, including:

an obtaining module, configured to obtain a target image of a real object acquired by a camera when the real object makes a limb movement;

a processing module, configured to input the target image into a coordinate acquisition model to obtain coordinates of a plurality of key points on a limb of the real object in the target image;

a determining module, configured to determine a posture of the limb of the real object according to coordinates of each key point;

a driving module, configured to drive, according to the posture of the real object, a virtual object displayed on a screen to present the limb movement of the real object.

According to yet another aspect of the present application, an electronic device is provided, including:

at least one processor; and a memory communicatively connected to the at least one processor; where the memory stores instructions executable by the at least one processor, and the instructions are executed by the at least one processor to enable the at least one processor to execute the method in the first aspect described above.

According to still another aspect of the present application, a non-transitory computer readable storage medium storing computer instructions is provided, and the computer instructions are used for causing a computer to execute the method in the first aspect described above.

According to technologies of the present application, coordinates of key points on a limb of a real object can be determined using a target image of the real object acquired by a camera when the real object makes a limb movement, and a posture of the limb of the real object can be determined using these coordinates, so that a virtual object on a screen can be driven to present the limb movement of the real object based on the posture of the limb of the real object. In this process, a real person user can drive the virtual object only by standing within a lens range of the camera and making a limb movement, without using any additional device, thus greatly reducing operation complexity and cost consumption when driving a virtual image, being suitable for actual needs of users in scenarios such as virtual image driving in a live streaming platform, and greatly improving user experience. Meanwhile, the above process uses the coordinates of key points to determine the posture of the limb of the real object and drive the virtual image, which can also ensure high joint flexibility when driving the virtual image and ensure a better effect of the virtual image driving.

It should be understood that what is described in this section is not intended to identify key or important features of the embodiments in the present application, nor is it intended to limit the scope of the present application. Other features of the present application will become apparent from the following description.

BRIEF DESCRIPTION OF DRAWINGS

The drawings are for better understanding of the present scheme and do not constitute a limitation of the present application. In the drawings.

DESCRIPTION OF EMBODIMENTS

Exemplary embodiments of the present application are described below in conjunction with the drawings, including various details of embodiments in the present application to facilitate understanding, which should be considered as merely exemplary. Therefore, it should be aware by persons of ordinary skill in the art that various changes and modifications may be made to the embodiments described herein without departing from scope and spirit of the present application. Similarly, for the sake of clarity and conciseness, descriptions of well-known functions and structures are omitted in the following description.

The prior art depends on a special movement capture equipment to perform a virtual character driving, and the movement capture equipment is generally a complete set of devices, including a series of trackers, which need to be worn by a real person. When the real person makes a limb movement, positions of the trackers change. A processing device calculates position change information of a limb based on position changes of the trackers, and then drives a virtual character based on the position change information of the limb. On the one hand, this approach requires a real person to wear special devices, which will thus lead to complicated operations when driving the virtual character. On the other hand, cost of the special movement capture equipment is often relatively expensive, which is difficult for users with low cost requirements. For example, for users who drive a virtual character on a live streaming platform, they often cannot afford a high cost.

In view of the problem of complicated operations and high cost caused by using a motion capture equipment to drive a virtual character in the prior art, in the embodiments of the present application, a posture of a real person is obtained based on an image of the real person acquired by a camera when the real person makes a limb movement, and a virtual character is driven based on the posture of the real person without a load operation and extra device, thus implementing a convenient and low-cost virtual character driving.

Figure 1:
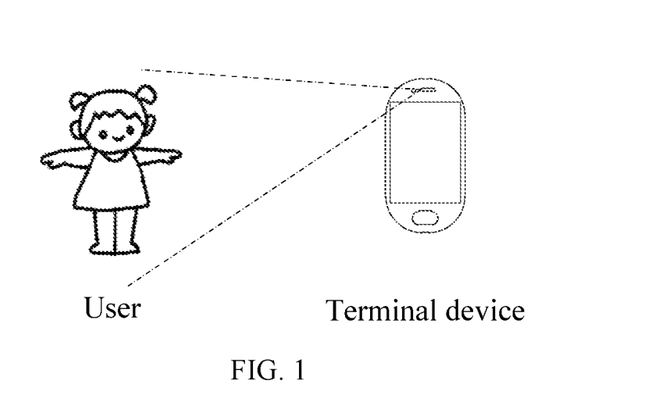
FIG. 1 is a schematic diagram of an exemplary scenario of a virtual object driving method provided by an embodiment of the present application.

FIG. 1 is a schematic diagram of an exemplary scenario of a virtual object driving method provided by an embodiment of the present application. As shown in FIG. 1, the method relates to a real person user and a terminal device. A camera is disposed on the terminal device. An image when the real person user makes a limb movement is acquired by the camera, and the terminal device drives a virtual object displayed on a screen of the terminal device based on the method of the embodiment of the present application to present the limb movement of the real person user.

Figure 2:
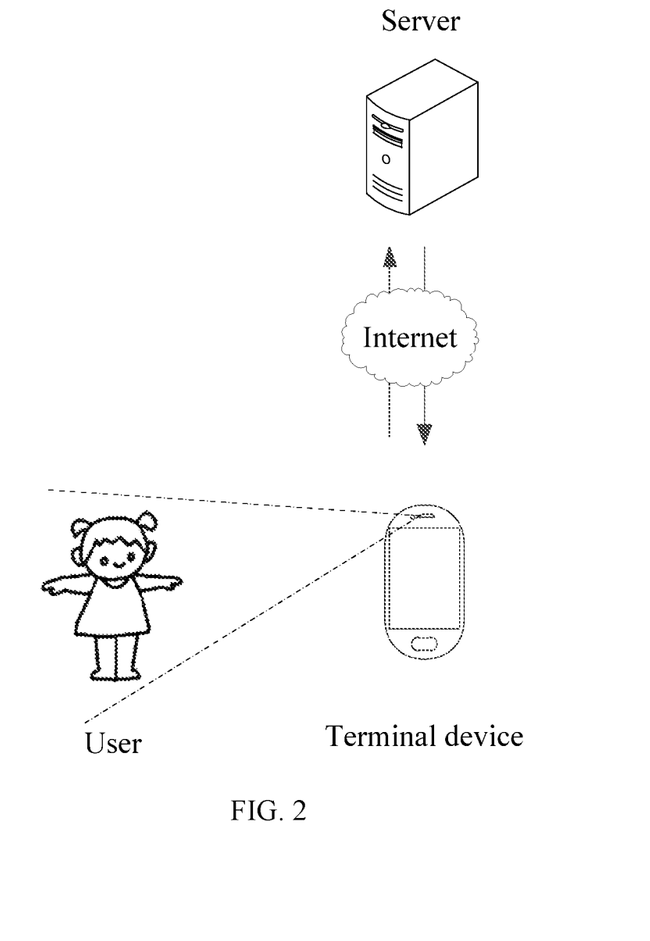
FIG. 2 is a schematic diagram of an exemplary scenario of a virtual object driving method provided by another embodiment of the present application.

FIG. 2 is a schematic diagram of an exemplary scenario of a virtual object driving method provided by another embodiment of the present application. As shown in FIG. 2, the method relates to a terminal device and a server, and the terminal device is communicatively connected to the server. A camera is disposed on the terminal device. An image when a real person user makes a limb movement is acquired by the camera, and the terminal device sends the image acquired by the camera to the server. The server uses the method of the embodiment of the present application to drive a virtual object displayed on a terminal device to present the limb movement of the real person user.

Figure 3:
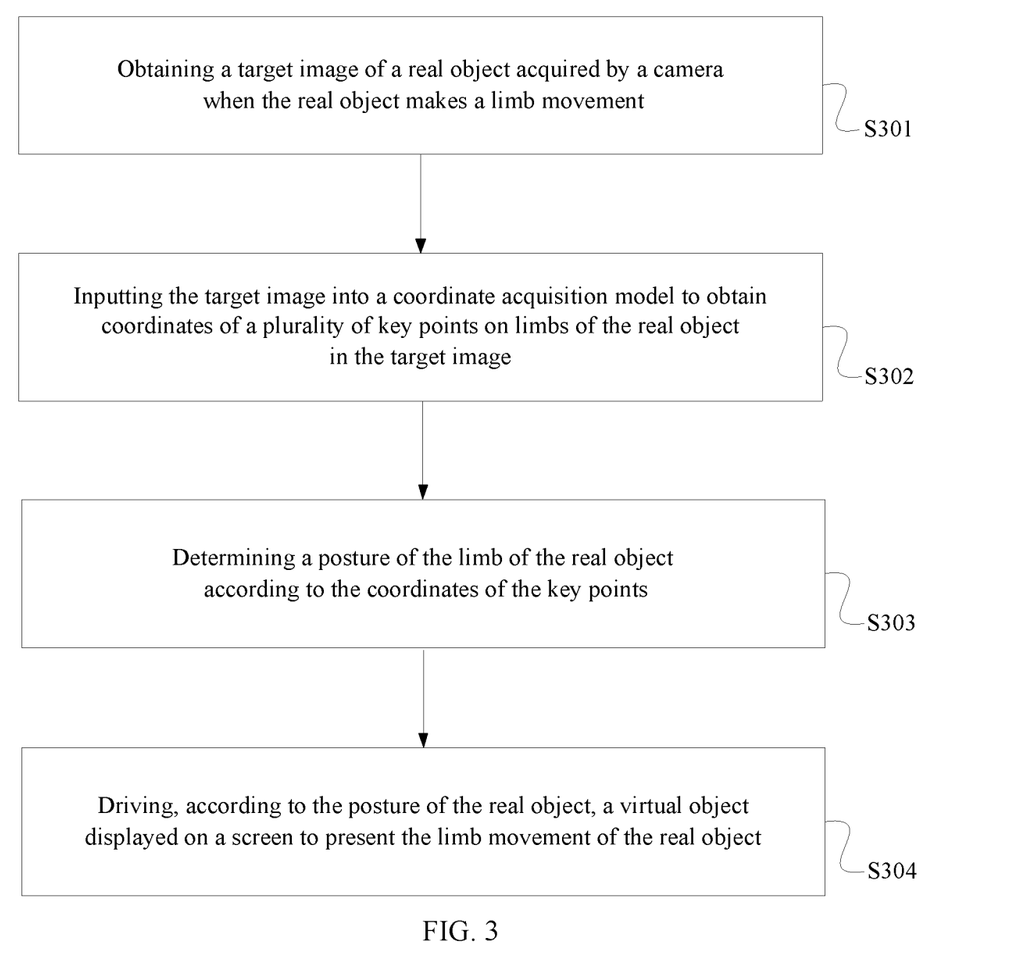
FIG. 3 is a schematic flowchart of a virtual driving method provided by an embodiment of the present application.

FIG. 3 is a schematic flowchart of a virtual driving method provided by an embodiment of the present application. An executive entity of the method may be the terminal device illustrated in FIG. 1 or the server illustrated in FIG. 2. The following embodiments of the present application take the terminal device being an executive entity as an example for explanation. As shown in FIG. 3, the method includes:

S301: obtaining a target image of a real object acquired by a camera when the real object makes a limb movement.

Optionally, the real object of the embodiments of the present application may refer to a real person, or may also refer to a real animal. The embodiments of the present application are explained by taking a real person as an example.

The camera may be a camera disposed on the terminal device, or the camera may be an independent device or disposed on other devices instead of the terminal device. If the camera is not disposed on the terminal device, the image may be sent to the terminal device by a device where the camera is located.

Optionally, the camera may be a monocular camera or a binocular camera, and the embodiments of the present application do not limit a specific form of the camera.

Optionally, the camera may acquire images according to a certain period. When the real object makes the limb movement, the camera acquires the target image, and the target image may include the limb movement of the real object. For example, if the real object makes a limb movement of extending an arm, an image acquired by the camera includes the movement of extending the arm of the real object.

S302: inputting the target image into a coordinate acquisition model to obtain coordinates of a plurality of key points on a limb of the real object in the target image.

Optionally, a plurality of key points on the limb of the real object may refer to a plurality of joints on the limb. For example, a shoulder joint of the real person is a key point, a left elbow joint is a key point, and joints of each finger are all key points.

The coordinate acquisition model may be a pre-trained model, such as a neural network model.

Based on the coordinate acquisition model, two-dimensional coordinates of a plurality of key points may be obtained, or three-dimensional coordinates of a plurality of key points may be obtained, which may be flexibly selected according to an application scenario.

For example, if a virtual object to be presented is a two-dimensional object, only two-dimensional coordinates of a plurality of key points may be obtained. If a virtual object to be presented is a three-dimensional object, three-dimensional coordinates of a plurality of key points may be obtained.

S303: determining a posture of the limb of the real object according to the coordinates of the above key points.

Optionally, position change information among the key points may be obtained using coordinates of each key point, and the posture of the limb of the real object may be obtained based on the position change information. Exemplary, when a real person makes a limb movement of bending his/her arm, there are position changes among elbow joints, shoulder joints and wrist joints. Using such position changes, a posture that the real person's arm is bent can be obtained.

The posture of the limb may be represented by an angle and the like, and a specific process will be described in detail in the following embodiments.

S304: driving, according to the posture of the real object, a virtual object displayed on a screen to present the limb movement of the real object.

The screen may refer to a screen on the terminal device.

The virtual object may be a virtual character, an animal character, etc. The embodiments of the present application do not limit a specific form of the virtual object.

Exemplary, if the posture of the real person is arm bending, an arm of the virtual object may be driven to rotate accordingly according to an angle of the arm bending, thus presenting a same limb movement as the real object.

When the executive entity of the embodiments of the present application is a server, when driving virtual object, the server can send a driving instruction to the terminal device which executes the instruction to cause a virtual image to present the same limb movement as the real object.

Figure 4:
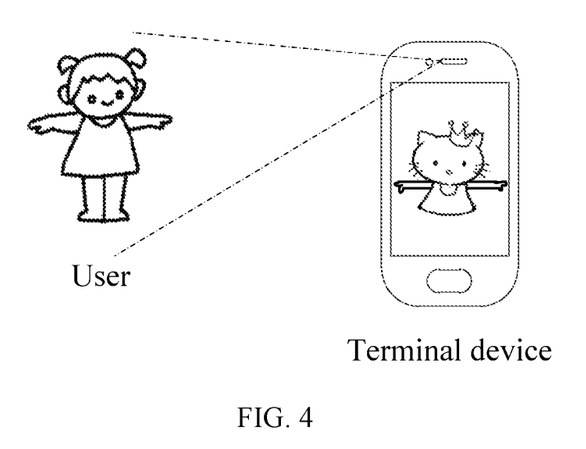
FIG. 4 is a schematic diagram of an effect of an embodiment of the present application.

FIG. 4 is a schematic diagram of an effect of an embodiment of the present application. As shown in FIG. 4, a real person user makes a limb movement of extending his/her arms, and a camera of a mobile phone acquires an image of the real person user making this movement. A virtual object selected by the user on the mobile phone is a cartoon image of a cat. The mobile phone rotates arms of the virtual cat based on the image of the user extending his/her arms acquired by the camera, and presents an effect of the virtual cat extending arms on a screen.

In the embodiment, the coordinates of key points on the limb of the real object can be determined using the target image acquired by the camera when the real object makes the limb movement, and the posture of the limb of the real object can be determined using these coordinates, so that the virtual object on the screen can be driven to present the limb movement of the real object based on the posture of the limb of the real object. In this process, the real person user can drive the virtual object only by standing within a lens range of the camera and making the limb movement, without using any additional device, thus greatly reducing operation complexity and cost consumption when driving the virtual image, being suitable for actual needs of users in a scenario such as virtual image driving in a live streaming platform, and greatly improving user experience. Meanwhile, the above process uses the coordinates of key points to determine the posture of the limb of the real object and drive the virtual image, which can also ensure high joint flexibility when driving the virtual image and ensure a better effect of the virtual image driving.

As an optional implementation, when determining limb coordinates of the real object according to the coordinates of key points, it can be determined based on an angle between key points.

Figure 5:
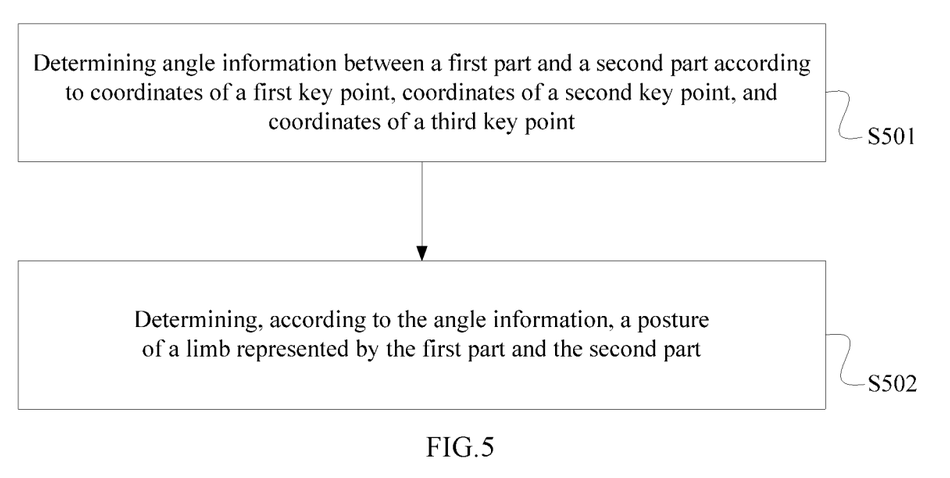
FIG. 5 is a schematic flowchart of a virtual driving method provided by another embodiment of the present application.

FIG. 5 is a schematic flowchart of a virtual driving method provided by another embodiment of the present application. As shown in FIG. 5, an optional manner of the step S303 includes:

S501: determining angle information between a first part and a second part according to coordinates of a first key point, coordinates of a second key point, and coordinates of a third key point.

The first part is represented by the first key point and the second key point adjacent to the first key point, and the second part is represented by the second key point and the third key point adjacent to the second key point. The second key point is a connection point between the first part and the second part.

The first key point is adjacent to the second key point, which means that there is no other key point between the first key point and the second key point.

Figure 6:
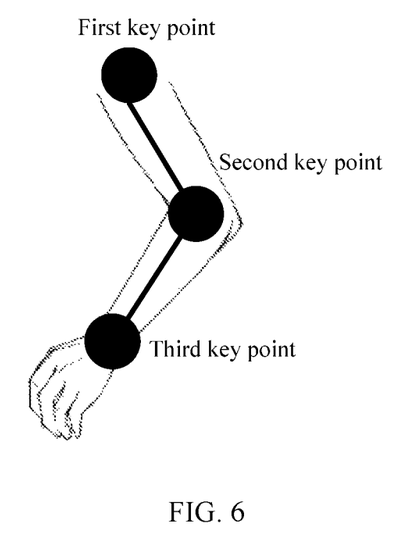
FIG. 6 is a schematic diagram of key points on an arm.

Exemplary, if the first key point is a shoulder joint, the second key point is an elbow joint, and the third key point is a wrist joint, then a big arm may be represented by a connection between the shoulder joint and the elbow joint, and a forearm may be represented by a connection between the elbow joint and the wrist joint. FIG. 6 is a schematic diagram of key points on an arm. As shown in FIG. 6, with the shoulder joint being the first key point, the elbow joint being the second key point, the wrist joint being the third key point, a connection between the first key point and the second key point may represent a big arm, and a connection between the second key point and the third key point may represent a forearm.

The first key point and the second key point can represent the first part, and the second key point and the third key point can represent the second part. Therefore, angle information between the first part and the second part can be determined using coordinates of these three key points.

Optionally, the angle information may be an included angle, an axis angle, an Euler angle, a quaternion, etc.

When coordinates of the key points are two-dimensional coordinates and three-dimensional coordinates, a process of determining the angle information may be different. A specific process of determining the angle information will be described in detail in the following embodiments.

S502: determining, according to the angle information, a posture of a limb represented by the first part and the second part.

Optionally, by taking the angle information being an included angle as an example, after calculating an included angle between the first part and the second part through the above-mentioned step, the included angle can be regarded as the posture between the first part and the second part. Exemplary, when the included angle between the big arm and the forearm is calculated to be 90 degrees, the 90 degrees is regarded as the posture of the limb of the real object, and a forearm of a driven object rotates upwards by 90 degrees, thus realizing a limb movement of the driven object presenting bending of the forearm.

In the embodiment, angle information between two parts can be determined based on the coordinates of three key points, and the limb posture of the real object can be determined based on the angle information between the parts. In this way, limb posture information is obtained with less computation, and an actual posture of the limb can be accurately represented at the same time.

As mentioned above, the coordinates of the key points may be either two-dimensional coordinates or three-dimensional coordinates. The following describes processes of determining the coordinates of key points using the coordinate acquisition model and determining the limb posture of the real object by in these two cases.

Firstly, a processing procedure when coordinates of key points are three-dimensional coordinates will be explained.

Optionally, the coordinate acquisition model can be trained in advance using preset training images and annotation data of the training images. The annotation data of the training images includes coordinates of each key point in the training images, and the annotation data is obtained by converting three-dimensional coordinates of key points in the training images under a camera coordinate system.

Specifically, before training the coordinate acquisition model, data required for model training is first annotated. Specifically, firstly, image collection is performed when the real object makes the limb movement; coordinates of each key point under the camera coordinate system are recorded in each collection, and pixel coordinates and depth values of each key point in the image are annotated. In the training process, the coordinate acquisition model converts the coordinates under the camera coordinate system into pixel coordinates and depth values of key points.

In the above-mentioned training process of the coordinate acquisition model, training may be carried out based on pre-selected key points and the coordinate acquisition model after the training only processes coordinates of these key points. The selection of the key points may be flexibly set according to an application scenario. Exemplary, if only an upper body of a virtual image is involved in a scenario, then only key points of the upper body may be selected, annotated and trained during model training.

After the training is completed, the coordinate acquisition model can be used in the above-mentioned process of determining the coordinates of key points.

Optionally, three-dimensional coordinates of the key points may refer to pixel coordinates and depth values of the key points, or may also refer to coordinates of the key points under the camera coordinate system.

The depth values refer to depth values of the key points under the camera coordinate system.

The posture of the real object can be calculated based on any one of the above-mentioned two kinds of three-dimensional coordinates as three-dimensional coordinates of the key points, so that the present application has higher flexibility.

In a first optional manner, if three-dimensional coordinates of a key point refer to pixel coordinates and depth values of the key point, the three-dimensional coordinates of the key point, i.e. the pixel coordinates and the depth values, can be directly obtained by the coordinate acquisition model after the target image is inputted into the coordinate acquisition model.

Optionally, a unit of pixel coordinates outputted by the coordinate acquisition model is pixel, which indicates uv coordinates of the key point mapped onto a two-dimensional image in the camera coordinate system. A unit of depth values is mm, which indicates a distance between the key point and the camera in the camera coordinate system.

In a second optional manner, if three-dimensional coordinates of a key point refer to coordinates of the key point under the camera coordinate system, the target image can be inputted into the coordinate acquisition model to obtain pixel coordinates of the key point in the target image and its depth value under the camera coordinate system which are outputted by the coordinate acquisition model. Then, coordinate conversion is carried out based on the pixel coordinates of the key point in the target image and the depth value of the key point under the camera coordinate system to obtain the coordinates of the key point under the camera coordinate system.

A process of obtaining the pixel coordinates of the key point in the target image and its depth value by the coordinate acquisition model is the same as that of the first optional manner, and will not be described in detail here. Furthermore, after obtaining the pixel coordinates and depth value, the pixel coordinates and depth value can be converted into the coordinates of the key point under the camera coordinate system according to an internal parameter of the camera.

In this way, the coordinates of the key point under the camera coordinate system can be obtained from the pixel coordinates and the depth value that are outputted by the model, so as to realize posture acquisition under the camera coordinate system.

After obtaining the three-dimensional coordinates of the key point through the above-mentioned process, the angle information between the first part and the second part can be determined in the step S501 using the three-dimensional coordinates.

Optionally, firstly, a three-dimensional vector of the first part is determined according to three-dimensional coordinates of the first key point and three-dimensional coordinates of the second key point, and a three-dimensional vector of the second part is determined according to the three-dimensional coordinates of the second key point and three-dimensional coordinates of the third key point. Then, the angle information between the first part and the second part is determined according to the three-dimensional vector of the first part and the three-dimensional vector of the second part.

By calculating three-dimensional vectors of adjacent parts, position information of the adjacent parts can be obtained, and then accurate angle information of the adjacent parts can be obtained using a difference between positions, thus making a calculation process simple and efficient.

The following describes a process of calculating the angle information between the first part and the second part based on three-dimensional coordinates of key points, by taking the angle information being the quaternion as an example.

At first, (x, y, z) are used to represent three-dimensional coordinates of a key point. It should be understood that when the three-dimensional coordinates of the key point are the coordinates in the first optional manner mentioned above, in (x, y, z), x and y represents pixel coordinates of the key point while z represents depth information; when the three-dimensional coordinates of the key point are the coordinates in the second optional manner mentioned above, (x, y, z) represents coordinates of the key point in the camera coordinate system, which will not be explained separately in the following.

Assuming that three key points are a shoulder joint, an elbow joint and a wrist joint, where three-dimensional coordinates of the shoulder joint is $A(x_A, y_A, z_A)$, three-dimensional coordinates of the elbow joint is $B(x_B, y_B, z_B)$, and three-dimensional coordinates of the wrist joint is $C(x_C, y_C, z_C)$, then quaternion between an arm's big arm and forearm is calculated by the following three steps.

1. Calculating space vectors of the big arm and the forearm using the following formulas (1) and (2), respectively.

$$A = (x_B - x_A, y_B - y_A, z_B - z_A) \quad (1)$$

$$B = (x_C - x_B, y_C - y_B, z_C - z_B) \quad (2)$$

2. Calculating a unit rotation axis and a rotation angle using the following formulas (3) and (4).

$$u = \frac{A \times B}{|A \times B|} \quad (3)$$

$$\theta = \arccos\left(\frac{A \cdot B}{|A||B|}\right) \quad (4)$$

3. Calculating the quaternion using the following formula (5).

$$q = \cos\frac{\theta}{2} + \sin\frac{\theta}{2}u \quad (5)$$

Where, $q_0 = \cos\frac{\theta}{2}$, $q_1 = \sin\frac{\theta}{2}u_x$, $q_2 = \sin\frac{\theta}{2}u_y$, and $q_3 = \sin\frac{\theta}{2}u_z$.

The following describes a processing procedure when coordinates of key points are two-dimensional coordinates.

When coordinates of a key point is two-dimensional coordinates, the two-dimensional coordinates are pixel coordinates of the key point in the target image.

In some scenarios, for example, when a virtual object is a two-dimensional plane image, the virtual object can be driven only using pixel coordinates of key points in the target image. Therefore, computational complexity can be reduced on the premise of satisfying requirements of the scenarios.

Optionally, when the key points are two-dimensional coordinates, the coordinate acquisition model can be trained only using two-dimensional annotated images. Specifically, when acquiring the image of the real object making the limb movement, pixel coordinates of each key point in the image are annotated. The trained coordinate acquisition model can output the pixel coordinates of the key points.

Specifically, the target image is inputted into the coordinate acquisition model to obtain the pixel coordinates of the key points in the target image which are outputted by the coordinate acquisition model.

In this way, complexity of the coordinate acquisition model can be greatly reduced on the premise of satisfying requirements of a two-dimensional scenario.

Or, the training mode for the three-dimensional coordinates is still used for the coordinate acquisition model. When using the model, after the model outputs the pixel coordinates and the depth information, only the pixel coordinates are used.

After obtaining the two-dimensional coordinates of the key points through the process mentioned above, the angle information between the first part and the second part can be determined in the step S501 using the two-dimensional coordinates.

Optionally, firstly, a two-dimensional vector of the first part is determined according to two-dimensional coordinates of the first key point and two-dimensional coordinates of the second key point, and a two-dimensional vector of the second part is determined according to the two-dimensional coordinates of the second key point and two-dimensional coordinates of the third key point. Then, the angle information between the first part and the second part is determined according to the two-dimensional vector of the first part and the two-dimensional vector of the second part.

By calculating two-dimensional vectors of adjacent parts, position information of the adjacent parts in the two-dimensional scenario can be obtained, and then accurate angle information of the adjacent parts can be obtained using a difference between positions, thus making a calculation process simple and efficient.

The following describes a process of calculating the angle information between the first part and the second part based on two-dimensional coordinates of key points, by taking the angle information being the included angle as an example.

Firstly, (x, y) are used to represent two-dimensional coordinates of a key point.

Assuming that three key points are a shoulder joint, an elbow joint, and a wrist joint, where two-dimensional coordinates of the shoulder joint is $A(x_A, y_A)$, two-dimensional coordinates of the elbow joint is $B(x_B, y_B)$, and two-dimensional coordinates of the wrist joint is $C(x_C, y_C)$, then an included angle between an arm's big arm and forearm is calculated by the following three steps.

1. Calculating space vectors of the big arm and the forearm using the following formulas (6) and (7), respectively.

$$\vec{AB} = (x_B - x_A, y_B - y_A) \quad (6)$$

$$\vec{BC} = (x_C - x_B, y_C - y_B) \quad (7)$$

2. Calculating moduli of space vectors of the big arm and the forearm using the following formulas (8) and (9).

$$|\vec{AB}| = \sqrt{(x_B - x_A)^2 + (y_B - y_A)^2} \quad (8)$$

$$|\vec{BC}| = \sqrt{(x_C - x_B)^2 + (y_C - y_B)^2} \quad (9)$$

3. Calculating an included angle θ between the big arm and the forearm using the following formula (10).

$$\theta = \arccos\frac{\vec{AB} * \vec{BC}}{|\vec{AB}| * |\vec{BC}|} \quad (10)$$

As described in the step S304, the virtual object can be driven to present the limb movement of the real object according to the posture of the real object, which may specifically be carried out in the following two manners.

In the first manner, driving may be carried out only based on the posture of the real object.

By taking the posture of the real object being the quaternion as an example, when driving the virtual object based on the quaternion, a limb of the virtual object can be rotated based on the quaternion, thus presenting the posture of the limb of the real object.

In the second manner, the virtual object displayed on the screen may be driven to present the limb movement of the real object based on the posture of the real object and coordinates of key points of the real object.

The coordinates of the key points of the real object represent positions of the key points, and meanwhile, when the virtual object is driven based on the posture and the positions, both a posture and positions of the virtual object can be driven. For example, based on the quaternion, the virtual object can be driven to present the posture of the real object. And if the real object moves, such as walking a certain distance to the left, the coordinates of the key points change, and the virtual object can also be driven to move to the left using the coordinates.

Figure 7:
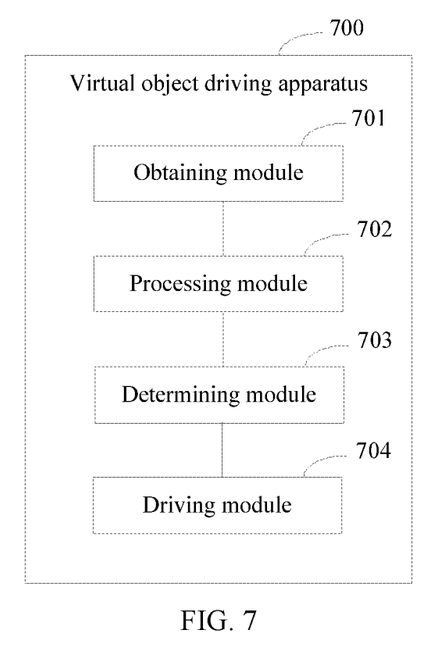
FIG. 7 is a modular structural diagram of a virtual object driving apparatus provided by an embodiment of the present application.

FIG. 7 is a modular structural diagram of a virtual object driving apparatus provided by an embodiment of the present application. As shown in FIG. 7, the apparatus includes:

an obtaining module 701, configured to obtain a target image of a real object acquired by a camera when the real object makes a limb movement;

a processing module 702, configured to input the target image into a coordinate acquisition model to obtain coordinates of a plurality of key points on a limb of the real object;

a determining module 703, configured to determine a posture of the limb of the real object according to coordinates of each key point;

a driving module 704, configured to drive, according to the posture of the real object, a virtual object displayed on a screen to present the limb movement of the real object.

As an optional implementation, the determining module 703 is specifically configured to:

determine angle information between a first part and a second part according to coordinates of a first key point, coordinates of a second key point, and coordinates of a third key point; where the first part is represented by the first key point and the second key point adjacent to the first key point, the second part is represented by the second key point and the third key point adjacent to the second key point, and the second key point is a connection point between the first part and the second part; determine, according to the angle information, a posture of a limb represented by the first part and the second part.

As an optional implementation, the coordinates are three-dimensional coordinates; the three-dimensional coordinates include pixel coordinates of the key points in the target image and depth values of the key points under a camera coordinate system, or the three-dimensional coordinates are coordinates of the key points in the camera coordinate system.

As an optional implementation, if the three-dimensional coordinates are the coordinates of the key points in the camera coordinate system, the processing module 702 is specifically configured to:

input the target image into the coordinate acquisition model to obtain pixel coordinates of the key points in the target image and depth values of the key points under the camera coordinate system which are outputted by the coordinate acquisition model; perform coordinate conversion based on the pixel coordinates of the key points in the target image and the depth values of the key points under the camera coordinate system to obtain the coordinates of the key points under the camera coordinate system.

As an optional implementation, the processing module 702 is specifically configured to:

determine a three-dimensional vector of the first part according to three-dimensional coordinates of the first key point and three-dimensional coordinates of the second key point; determine a three-dimensional vector of the second part according to the three-dimensional coordinates of the second key point and three-dimensional coordinates of the third key point; and determine the angle information between the first part and the second part according to the three-dimensional vector of the first part and the three-dimensional vector of the second part.

As an optional implementation, the coordinates are two-dimensional coordinates; the two-dimensional coordinates are pixel coordinates of the key points in the target image.

As an optional implementation, the processing module 702 is specifically configured to:

input the target image into the coordinate acquisition model to obtain the pixel coordinates of the key points in the target image which are outputted by the coordinate acquisition model.

As an optional implementation, the determining module 703 is specifically configured to: determine a two-dimensional vector of the first part according to two-dimensional coordinates of the first key point and two-dimensional coordinates of the second key point; determine a two-dimensional vector of the second part according to the two-dimensional coordinates of the second key point and two-dimensional coordinates of the third key point; determine the angle information between the first part and the second part according to the two-dimensional vector of the first part and the two-dimensional vector of the second part.

As an optional implementation, the driving module 704 is specifically configured to:

drive the virtual object displayed on the screen to present the limb movement of the real object according to the posture of the real object and the coordinates of the key points of the real object.

As an optional implementation, the processing module 702 is further configured to:

train the coordinate acquisition model using preset training images and annotation data of the training images.

The annotation data of the training images includes coordinates of each key point in the training images, and the annotation data is obtained by converting three-dimensional coordinates of key points in the training images under the camera coordinate system.

According to embodiments of the present application, the present application further provides an electronic device and a readable storage medium.

Figure 8:
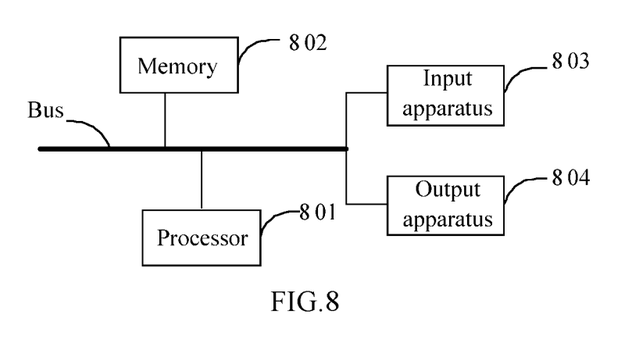
FIG. 8 is a block diagram of an electronic device for a virtual object driving method according to an embodiment of the present application.

As shown in FIG. 8, FIG. 8 is a block diagram of an electronic device for a virtual object driving method according to an embodiment of the present application. The electronic device is intended to represent various forms of digital computers, such as a laptop computer, a desktop computer, a workstation, a personal digital assistant, a server, a blade server, a mainframe computer, and other suitable computers. The electronic device may also represent various forms of mobile devices, such as a personal digital processing assistant, a cellular phone, a smart phone, a wearable device, and other similar computing devices. Components shown herein, their connections and relationships, and their functions are merely examples, and are not intended to limit implementations of the present application described and/or claimed herein.

As shown in FIG. 8, the electronic device includes one or more processors 801, a memory 802, and interfaces for connecting various components, including a high-speed interface and a low-speed interface. The components are connected to each other using different buses, and may be mounted on a common main board or in other manners as required. The processor may process instructions executed within the electronic device, including instructions stored in or on the memory to display graphical information of a GUI on an external input/output apparatus (such as a display device coupled to an interface). In other embodiments, a plurality of processors and/or a plurality of buses may be used with a plurality of memories, if needed. Similarly, a plurality of electronic devices may be connected and each device provides some necessary operations (for example, as a server array, a group of blade servers, or a multiprocessor system). In FIG. 8, one processor 801 is taken as an example.

The memory 802 is the non-transitory computer-readable storage medium provided in the present application. The memory stores instructions executable by at least one processor, so as to enable the at least one processor to execute the virtual object driving method provided by the present application. The non-transitory computer-readable storage medium of the present application stores computer instructions for causing a computer to execute the virtual object driving method provided by the present application.

As a non-transitory computer-readable storage medium, the memory 802 may be used to store a non-transitory software program, a non-transitory computer-executable program and modules, such as program instructions/modules corresponding to the virtual object driving method in the embodiments of the present application (for example, the obtaining module 701 and the processing module 702 shown in FIG. 7). The processor 801 executes various functional applications and data processing of the electronic device by running the non-transitory software program, instructions and modules stored in the memory 802, that is, implements the virtual object driving method in the method embodiments described above.

The memory 802 may include a program storage area and a data storage area, where the program storage area may store an application program required by an operating system and at least one function; the data storage area may store data created according to use of an electronic device for virtual object driving, etc. In addition, the memory 802 may include a high-speed random access memory, and may also include a non-transitory memory, such as at least one disk storage device, a flash memory device, or other non-transitory solid-state storage devices. In some embodiments, the memory 802 may optionally include memories remotely located with respect to the processor 801, and these remote memories may be connected to the electronic device for virtual object driving through a network. Examples of the network include, but are not limited to, the Internet, an intranet, a local area network, a mobile communication network and combinations thereof.

The electronic device for the virtual object driving method may further include an input apparatus 803 and an output apparatus 804. The processor 801, the memory 802, the input apparatus 803, and the output apparatus 804 may be connected by a bus or other ways. FIG. 8 takes a connection via a bus as an example.

The input apparatus 803 may receive inputted digital or character information and generate key signal inputs related to user setting and function control of the electronic device for virtual object driving, such as a touch screen, a keypad, a mouse, a track pad, a touch pad, an indication rod, one or more mouse buttons, a trackball, a joystick and other input apparatuses. The output apparatus 804 may include a display device, an auxiliary lighting apparatus (e.g., an LED), a tactile feedback apparatus (e.g., a vibration motor), etc. The display device may include, but is not limited to, a liquid crystal display (LCD), a light emitting diode (LED) display, and a plasma display. In some implementations, the display device may be a touch screen.

Various implementations of systems and technologies described herein may be implemented in a digital electronic circuit system, an integrated circuit system, a special-purpose ASIC (application specific integrated circuit), computer hardware, firmware, software, and/or combinations thereof. These various embodiments may include being implemented in one or more computer programs that may be executed and/or interpreted on a programmable system including at least one programmable processor, which may be a special-purpose or general-purpose programmable processor, and which may receive data and instructions from a storage system, at least one input apparatus and at least one output apparatus, and transmit data and instructions to the storage system, the at least one input apparatus and the at least one output apparatus.

These computing programs (also called programs, software, software applications, or codes) include machine instructions of a programmable processor, and may be implemented using high-level procedures and/or object-oriented programming languages, and/or assembly/machine languages. As used herein, the terms "machine-readable medium" and "computer-readable medium" refer to any computer program product, device, and/or apparatus (e.g., a magnetic disk, an optical disk, a memory, a programmable logic device (PLD)) for providing machine instructions and/or data to a programmable processor, including a machine-readable medium that receives machine instructions as machine-readable signals. The term "machine-readable signal" refers to any signal used to provide machine instructions and/or data to a programmable processor.

To provide interaction with a user, the systems and the technologies described herein may be implemented on a computer having: a display apparatus (e.g., a CRT (cathode ray tube) or a LCD (liquid crystal display) monitor) for displaying information to the user; and a keyboard and a pointing apparatus (e.g., a mouse or a trackball) through which the user can provide inputs to the computer. Other kinds of apparatuses may also be used to provide interaction with the user; for example, feedback provided to the user may be any form of sensory feedback (for example, visual feedback, auditory feedback, or tactile feedback); and inputs from the user may be received in any form (including acoustic input, voice input or tactile input).

The systems and technologies described herein may be implemented in a computing system including a background component (e.g., as a data server), a computing system including a middleware component (e.g., an application server), or a computing system including a front-end component (e.g., a user computer with a graphical user interface or a web browser through which a user may interact with the implementations of the systems and technologies described herein), or a computing system including any combination of the background component, the middleware component, or the front-end component. Components of the system may be connected to each other through digital data communication in any form or medium (e.g., a communication network). Examples of the communication network include a local area network (LAN), a wide area network (WAN), and the Internet.

A computer system may include a client and a server. The client and the server are generally remote from each other and commonly interact through a communication network. The relationship between the client and the server is generated by computer programs running on corresponding computers and having a client-server relationship with each other. The server may be a cloud server, also known as a cloud computing server or a cloud host, which is a host product in a cloud computing service system, so as to solve defects of difficult management and weak service scalability in a traditional physical host and a VPS service.

It should be understood that steps may be reordered, added, or deleted using various forms of procedures shown above. For example, the steps described in the present application may be executed in parallel, sequentially, or in a different order, so long as a desired result of technical solutions disclosed in the present application can be achieved, and there is no limitation herein.

The above-mentioned specific implementations do not limit the protection scope of the present application. It should be understood by those skilled in the art that various modifications, combinations, subcombinations, and substitutions may be made according to design requirements and other factors. Any modification, equivalent substitution, improvement and the like made within spirit and principle of the present application shall be included in the protection scope of the present application.

What is claimed is:

1. A virtual object driving method, comprising:
   obtaining a target image of a real object acquired by a camera when the real object makes a limb movement;

inputting the target image into a coordinate acquisition model to obtain coordinates of a plurality of key points on a limb of the real object in the target image;

determining a posture of the limb of the real object according to coordinates of the plurality of key points; and driving, according to the posture of the limb of the real object, a virtual object displayed on a screen to present the limb movement of the real object, wherein the determining the posture of the limb of the real object according to the coordinates of the plurality of key points comprises:

determining angle information between a first part and a second part according to coordinates of a first key point, coordinates of a second key point, and coordinates of a third key point; wherein the angle information comprises a quaternion, the first part is represented by the first key point and the second key point adjacent to the first key point, the second part is represented by the second key point and the third key point adjacent to the second key point, and the second key point is a connection point between the first part and the second part; and determining the posture of the limb represented by the first part and the second part according to the angle information, wherein the coordinates of the first key point are $A(x_A, y_A, z_A)$, the coordinates of the second key point are $B(x_B, y_B, z_B)$, the coordinates of the third key point are $C(x_C, y_C, z_C)$, and the determining the angle information between the first part and the second part according to the coordinates of the first key point, the coordinates of the second key point, and the coordinates of the third key point, comprises:

calculating space vectors of the first part and the second part using following formulas (1) and (2);

$$A = (x_B - x_A, y_B - y_A, z_B - z_A) \tag{1}$$

$$B = (x_C - x_B, y_C - y_B, z_C - z_B) \tag{2}$$

calculating a unit rotation axis and a rotation angle using following formulas (3) and (4);

$$u = \frac{A \times B}{|A \times B|} \tag{3}$$

$$\theta = \arccos\left(\frac{A \cdot B}{|A||B|}\right) \tag{4}$$

calculating the quaternion using a following formula (5), $$q = \cos\frac{\theta}{2} + \sin\frac{\theta}{2} u \text{ wherein} \tag{5}$$

$u = (u_x, u_y, u_z) = u_x i + u_y j + u_z k,$ $q = q_0 + q_1 i + q_2 j + q_3 k,$ $q_0 = \cos\frac{\theta}{2},$ $q_1 = \sin\frac{\theta}{2} u_x,$ $q_2 = \sin\frac{\theta}{2} u_y,$ and $q_3 = \sin\frac{\theta}{2} u_z,$ wherein $q_0, q_1, q_2,$ and $q_3$, are real numbers; i, j, and k are symbols representing unit-vectors pointing along three spatial axes; and $u_x, u_y,$ and $u_z$ are coordinates of the unit rotation axis in the three spatial axes.

2. The method according to claim 1, wherein the coordinates are three-dimensional coordinates; the three-dimensional coordinates comprise pixel coordinates of the key points in the target image and depth values of the key points in a camera coordinate system, or, the three-dimensional coordinates are coordinates of the key points in the camera coordinate system.

3. The method according to claim 2, wherein if the three-dimensional coordinates are the coordinates of the key points in the camera coordinate system, the inputting the target image into the coordinate acquisition model to obtain the coordinates of the plurality of key points on the limb of the real object in the target image comprises:

inputting the target image into the coordinate acquisition model to obtain pixel coordinates of the key points in the target image and depth values of the key points under the camera coordinate system which are outputted by the coordinate acquisition model; and performing coordinate conversion based on the pixel coordinates of the key points in the target image and the depth values of the key points under the camera coordinate system to obtain the coordinates of the key points in the camera coordinate system.

4. The method according to claim 1, wherein the driving, according to the posture of the limb of the real object, the virtual object displayed on the screen to present the limb movement of the real object comprises:

driving, according to the posture of the limb of the real object and the coordinates of the key points of the real object, the virtual object displayed on the screen to present the limb movement of the real object.

5. The method according to claim 1, wherein the plurality of key points on the limb of the real object comprise a plurality of joints on the limb.

6. The method according to claim 1, wherein the first key point is a shoulder joint, the second key point is an elbow joint, the third key point is a wrist joint, a connection between the first key point and the second key point represents a big arm, and a connection between the second key point and the third key point represents a forearm.

7. A virtual object driving apparatus, comprising:

at least one processor; and a memory communicatively connected to the at least one processor; wherein, the memory stores instructions executable by the at least one processor, and the instructions are executed by the at least one processor to enable the at least one processor to:

obtain a target image of a real object acquired by a camera when the real object makes a limb movement;

input the target image into a coordinate acquisition model to obtain coordinates of a plurality of key points on a limb of the real object in the target image;

determine a posture of the limb of the real object according to the coordinates of the plurality of key points;

drive, according to the posture of the limb of the real object, a virtual object displayed on a screen to present the limb movement of the real object, wherein the at least one processor is further enabled to:
- determine angle information between a first part and a second part according to coordinates of a first key point, coordinates of a second key point, and coordinates of a third key point; wherein the angle information comprises a quaternion, the first part is represented by the first key point and the second key point adjacent to the first key point, the second part is represented by the second key point and the third key point adjacent to the second key point, and the second key point is a connection point between the first part and the second part; and
- determine the posture of the limb represented by the first part and the second part according to the angle information, wherein the coordinates of the first key point are $A(x_A, y_A, z_A)$, the coordinates of the second key point are $B(x_B, y_B, z_B)$, the coordinates of the third key point are $C(x_C, y_C, z_C)$, and the at least one processor is further enabled to:

calculate space vectors of the first part and the second part using following formulas (1) and (2);

$$A = (x_B - x_A, y_B - y_A, z_B - z_A) \quad (1)$$

$$B = (x_C - x_B, y_C - y_B, z_C - z_B) \quad (2)$$

calculate a unit rotation axis and a rotation angle using following formulas (3) and (4);

$$u = \frac{A \times B}{|A \times B|} \quad (3)$$

$$\theta = \arccos\left(\frac{A \cdot B}{|A||B|}\right) \quad (4)$$

calculate the quaternion using a following formula (5), $$q = \cos\frac{\theta}{2} + \sin\frac{\theta}{2} u \text{ wherein} \quad (5)$$

$$u = (u_x, u_y, u_z) = u_x i + u_y j + u_z k,$$

$$q = q_0 + q_1 i + q_2 j + q_3 k,$$

$$q_0 = \cos\frac{\theta}{2},$$

$$q_1 = \sin\frac{\theta}{2} u_x,$$

$$q_2 = \sin\frac{\theta}{2} u_y, \text{ and}$$

$$q_3 = \sin\frac{\theta}{2} u_z,$$

wherein $q_0, q_1, q_2$, and $q_3$, are real numbers; i, j, and k are symbols representing unit-vectors pointing along three spatial axes; and $u_x$, $u_y$, and $u_z$ are coordinates of the unit rotation axis in the three spatial axes.

8. The apparatus according to claim 7, wherein the coordinates are three-dimensional coordinates; the three-dimensional coordinates comprise pixel coordinates of the key points in the target image and depth values of the key points in a camera coordinate system, or,
- the three-dimensional coordinates are coordinates of the key points in the camera coordinate system.

9. The apparatus according to claim 8, wherein if the three-dimensional coordinates are the coordinates of the key points in the camera coordinate system, the at least one processor is further enabled to:
- input the target image into the coordinate acquisition model to obtain pixel coordinates of the key points in the target image and depth values of the key points under the camera coordinate system which are outputted by the coordinate acquisition model; and
- perform coordinate conversion based on the pixel coordinates of the key points in the target image and the depth values of the key points under the camera coordinate system to obtain the coordinates of the key points in the camera coordinate system.

10. The apparatus according to claim 7, wherein the at least one processor is further enabled to:
- drive, according to the posture of the limb of the real object and the coordinates of the key points of the real object, the virtual object displayed on the screen to present the limb movement of the real object.

11. The apparatus according to claim 7, wherein the at least one processor is further enabled to:
- train the coordinate acquisition model using preset training images and annotation data of the training images; wherein the annotation data of the training images comprises coordinates of each key point in the training images, and the annotation data is obtained by converting three-dimensional coordinates of the key points in the training images under a camera coordinate system.

12. A non-transitory computer-readable storage medium storing computer instructions, wherein the computer instructions are used for causing a computer to execute the method according to claim 1.

* * * * *